UNITED STATES PATENT OFFICE.

ERNST EMIL PILZ, OF SCHLETTAU, GERMANY.

TRANSPARENT TRANSFER-PICTURE.

SPECIFICATION forming part of Letters Patent No. 553,539, dated January 28, 1896.

Application filed June 6, 1895. Serial No. 551,916. (No specimens.)

*To all whom it may concern:*

Be it known that I, ERNST EMIL PILZ, a subject of the King of Saxony, residing at Schlettau, in the Kingdom of Saxony, German Empire, have invented certain new and useful Improvements in Transparent Transfer-Pictures, of which the following is a full, clear, and exact description.

The process for manufacturing transfer-pictures hitherto employed consists in printing the picture in the reverse manner to ordinary picture-printing, the colors being applied in the reverse manner, the darkest first and then successively lighter ones until the lightest color, yellow, is reached. The whole is then covered with a layer of albumin or leaf metal in order to render the picture transferable and to impart to the same greater brilliancy, which is requisite since the colors are only applied in the ordinary thickness. Pictures of this kind, however, although translucent, are not transparent, and cannot be advantageously employed as transparencies, because they then lose much of the brilliancy which is imparted to them, as before mentioned, when an opaque packing is employed. Thus stained-glass imitations cannot be produced by pictures of this kind. In making real stained-glass representations the colors are first applied in the ordinary manner to the glass and then burned into the same, when they become practically integral therewith and have a relief appearance, which, in combination with the refraction of the rays of light, imparts to the whole a highly-artistic effect. This effect is entirely lost in the imitation stained glass produced by means of transfer-pictures and diaphanies, because the same are only translucent and not transparent. The plastic effect of stained glass has also hitherto not been attained with the imitations.

The object of the present invention is to obviate the previously-mentioned disadvantages and to produce imitation stained glass very nearly resembling the real article. In the process forming the object of the present invention certain colors are employed which are particularly prepared for the purpose, such colors being fast transparent ones, since these produce the best effect. These colors are prepared to dry quickly, and when applied to form a color film as soon as possible, so that the transparency and refraction of the film will not be disturbed by the films or colors subsequently applied, but will be increased, each film applied producing its own peculiar reflective effect.

The colors are mixed with water-glass and siccative, the former, as is known, possessing the property of combining with other substances, such as colors, to form stone-hard compounds. Since, however, such mixtures when applied in very thin films, as in the case of the present process, will easily crack and break, siccative is added, which not only imparts elasticity to the color but causes the same to dry quickly, so that the hardening effect of the water-glass will not be reduced, but rather increased. The siccative advantageously employed is produced by boiling linseed-oil with chemicals which give off oxygen. The colors thus prepared are applied to the paper previously provided with a layer of adhesive, not, however, as hitherto, in the reversed order, but in the proper succession and in such thickness as to produce a dull picture when finished—*i. e.*, a picture having a very dark appearance and in which the subject is very hard to recognize. This is done in order to enhance the brilliancy of the picture when transferred, because if printed with the ordinary thickness of color the same appears much lighter when the light shines through it, and loses much of its effectiveness.

The darker the picture appears on paper the better will be the effect when the same is applied to glass. The colors must of course be applied in the proper relative thickness, and it has been found advantageous to apply the same about two or three times as dark as the ordinary printing thickness.

The various colors are applied successively, and the whole is then covered with a layer of colorless material consisting of a mixture of pure varnish, water-glass and siccative. The object of this is to increase the strength of the film of color now attained, and then to protect the same as far as possible from outer disturbing or destroying influences when handling the picture. By means of this last coating the brilliancy of the picture when transferred is greatly increased owing to the transparency and the reflective quality possessed by the same. After the picture has been applied to the glass the paper is removed and the transparent color-film remains fast in the glass.

Pictures produced by the present process will have a greater thickness at those parts where the darkest effects are required owing to the increased number of color-films superposed to produce the required dark tint, and this circumstance tends to produce the plastic effect of real stained glass which has hitherto been wanting with imitations. The albumin layer of the transfer-pictures hitherto produced renders these non-transparent, the same being only translucent. The reflective effect peculiar to real stained glass is produced in the present process by applying the various colors separately and in transparent layers, and then in covering the whole with a perfectly-colorless layer. This effect cannot be produced by means of the diaphanies and transfer-pictures hitherto employed because the same are not transparent but only translucent.

Transfer-pictures of the kind described may be employed for other purposes than decorating glass. Thus, for instance, looking-glasses may be decorated with the same, the mercury being omitted at such parts as are covered by the picture, in which case very pretty effects may be obtained. The pictures when applied in this manner may be provided with a weatherproof coating of suitable kind.

I claim as my invention—

1. A process for producing stained glass imitations consisting in applying transparent colors worked up with waterglass and siccative, in the ordinary succession, as in lithographic printing, to a paper backing, previously provided with an adhesive coating, said colors being darker than in ordinary work and then coating the picture thus printed with colorless layer, consisting of a mixture of waterglass and siccative and transferring said picture to glass substantially as described.

2. A process for producing stained glass imitations consisting in applying transparent colors worked up with waterglass and siccative, in the ordinary succession, as in lithographic printing to a paper backing, previously provided with an adhesive coating, said colors being darker than in ordinary work and then coating the picture thus printed with colorless layer consisting of a mixture of waterglass and siccative and transferring said picture to glass and coating the whole with a layer of weatherproof material substantially as described.

3. Stained glass imitations produced by applying transparent colors worked up with waterglass and siccative, in the ordinary succession as in lithographic printing to a paper backing, previously provided with an adhesive coating, said colors being darker than in ordinary work and then coating the picture thus printed with colorless layer consisting of a mixture of waterglass and siccative and transferring said picture to glass substantially as described.

In witness whereof I hereunto set my hand in presence of two witnesses.

ERNST EMIL PILZ.

Witnesses:
W. BAUTZE,
JOHN B. JACKSON.